(12) United States Patent  
Huang

(10) Patent No.: US 9,116,554 B2
(45) Date of Patent: Aug. 25, 2015

(54) PORTABLE INPUT DEVICE

(71) Applicant: Cablesoft Technologies Inc., Taipei (TW)

(72) Inventor: Tsung-Jen Huang, Taipei (TW)

(73) Assignee: CABLESOFT TECHNOLOGIES INC, Taipei (TW)

( * ) Notice: Subject to any disclaimer, the term of this patent is extended or adjusted under 35 U.S.C. 154(b) by 43 days.

(21) Appl. No.: 14/092,580

(22) Filed: Nov. 27, 2013

(65) Prior Publication Data

US 2015/0145775 A1     May 28, 2015

(51) Int. Cl.
*G06F 3/02* (2006.01)
*G06F 3/03* (2006.01)
*G01B 11/14* (2006.01)
*G06F 3/0346* (2013.01)

(52) U.S. Cl.
CPC .............. *G06F 3/0304* (2013.01); *G01B 11/14* (2013.01); *G06F 3/0213* (2013.01); *G06F 3/0346* (2013.01)

(58) Field of Classification Search
CPC . G06F 21/79; G06F 21/86; G06F 2221/2129; G06F 7/57; G06F 9/226; G06F 9/265; G06F 9/30094; G06F 9/30101; G06F 9/3885; G06F 12/0866; G06F 1/1626; G06F 2212/2022; G06F 3/0421; G06F 2203/04109; G06F 3/0317; G06F 3/017; G06F 3/0202; G06F 3/0423; G06F 1/1601; G06F 1/1616; G06F 1/1624; G06F 1/166; G06F 1/1664; G06F 1/1684; G06F 3/014; G06F 3/0208; G06F 3/0216
USPC .................. 345/156, 157, 158, 165, 166, 169
See application file for complete search history.

(56) References Cited

U.S. PATENT DOCUMENTS 6,084,571 A * 7/2000 De Gotari ...................... 345/157
2008/0001921 A1 * 1/2008 Chen ............................. 345/166

* cited by examiner

*Primary Examiner* — Duc Dinh
(74) *Attorney, Agent, or Firm* — Muncy, Geissler, Olds & Lowe, P.C.

(57) ABSTRACT

A portable input device includes a casing, a light sensing module and a printed circuit board. The casing includes a reflecting member. The light sensing module is movably mounted on the reflecting member and exposed from the casing. The light sensing module includes a lighting member and a sensor both facing the reflecting member. The lighting member is adapted for emitting light to the reflecting member. The sensor is adapted for receiving the light reflected by the reflecting member and configured for transmitting a sensing signal. The printed circuit board is mounted on the casing and electrically connected to the light sensing module. The printed circuit board is configured for processing the sensing signal to compute a value of movement of the light sensing module moving with respect to the reflecting member.

8 Claims, 5 Drawing Sheets

PORTABLE INPUT DEVICE

TECHNICAL FIELD

The disclosure relates to an input device, and more particularly to, a portable input device.

BACKGROUND

So far, users may employ multiple different input devices to command or control an electronic device which execute or process data or information needed by the user. For instance, a remote control, which is taken as the input device, is used by the user to emit infrared to an electronic device (e.g., a television) such that the electronic device executes a certain specific program for the user accordingly.

With the development of technology, the boundary between television and computer is blurred. That is, users may not only watch television programs or films but also control multimedia programs on an operating system of the television. For instance, the operating system has a graphic interface, the user may control a cursor on the graphic interface to move to a position the user desired. Then, the user presses a button of the remote control to send a command to the operating system of the television. Specifically, the remote control comprises several buttons for controlling the movement of the cursor in a digital manner. Alternatively, the remote control may comprise a joystick to control the movement of the cursor in an analogical manner.

SUMMARY

An embodiment of the disclosure provides a portable input device comprising a casing, a light sensing module and a printed circuit board. The casing comprises a reflecting member. The light sensing module is movably mounted on the reflecting member and exposed from the casing. The light sensing module comprises a lighting member and a sensor both facing the reflecting member. The lighting member is adapted for emitting light to the reflecting member. The sensor is adapted for receiving the light reflected by the reflecting member and configured for transmitting a sensing signal. The printed circuit board is mounted on the casing and electrically connected to the light sensing module. The printed circuit board is configured for processing the sensing signal to compute a value of movement of the light sensing module moving with respect to the reflecting member.

BRIEF DESCRIPTION OF THE DRAWING

The disclosure will become more fully understood from the detailed description given herein below and the drawing are for illustration only, and thus does not limit the present disclosure, wherein.

DETAILED DESCRIPTION

Figure 1:
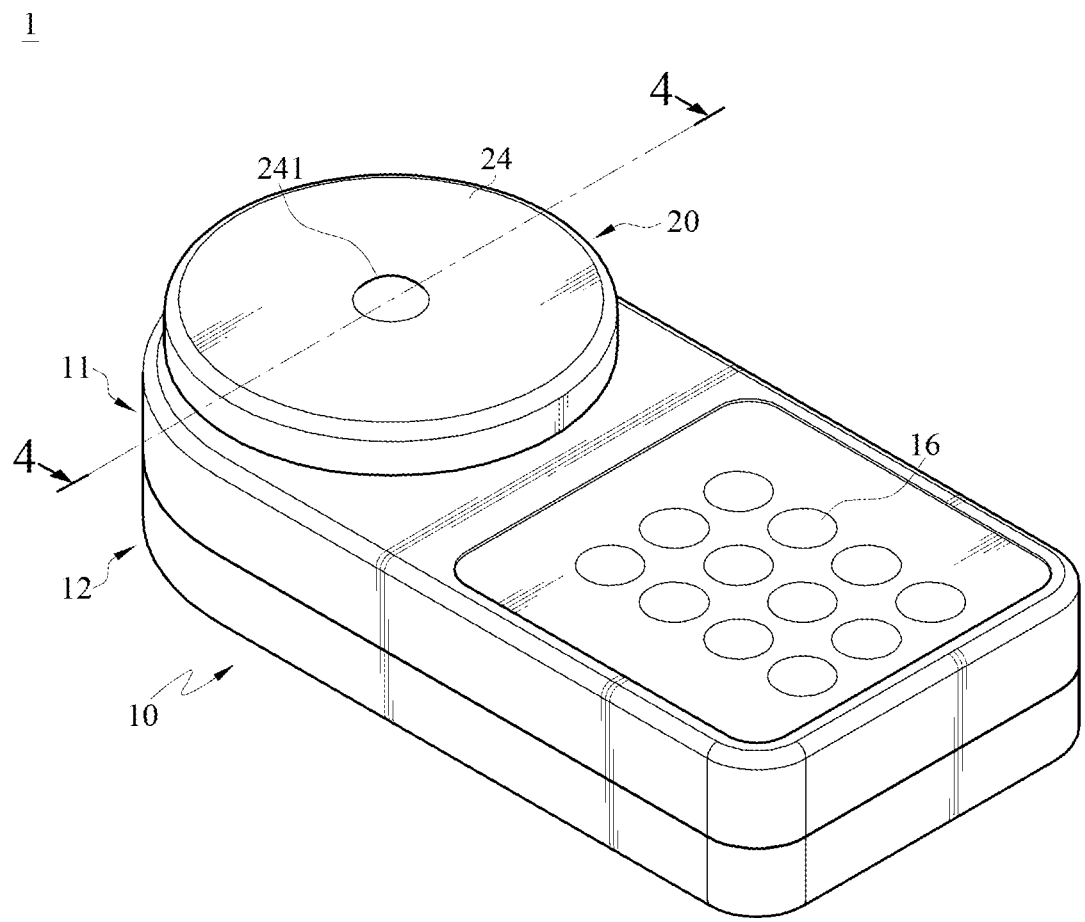
FIG. 1 is a perspective view of a portable input device according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The disclosure provides a portable input device for being electrically connected to an electronic device in a wire or wireless manner. A user may hold the portable input device by hands for controlling it to execute or process certain program or command of the electronic device. For instance, the portable input device controls a cursor displayed on a monitor of the electronic device to move accordingly. Moreover, for example, the electronic device is a computer, a laptop, a server, s set top box (STB), a television, a speaker, a lamp, a fan or a communication device (e.g., a cell phone), but is not limited to the disclosure.

Figure 2:
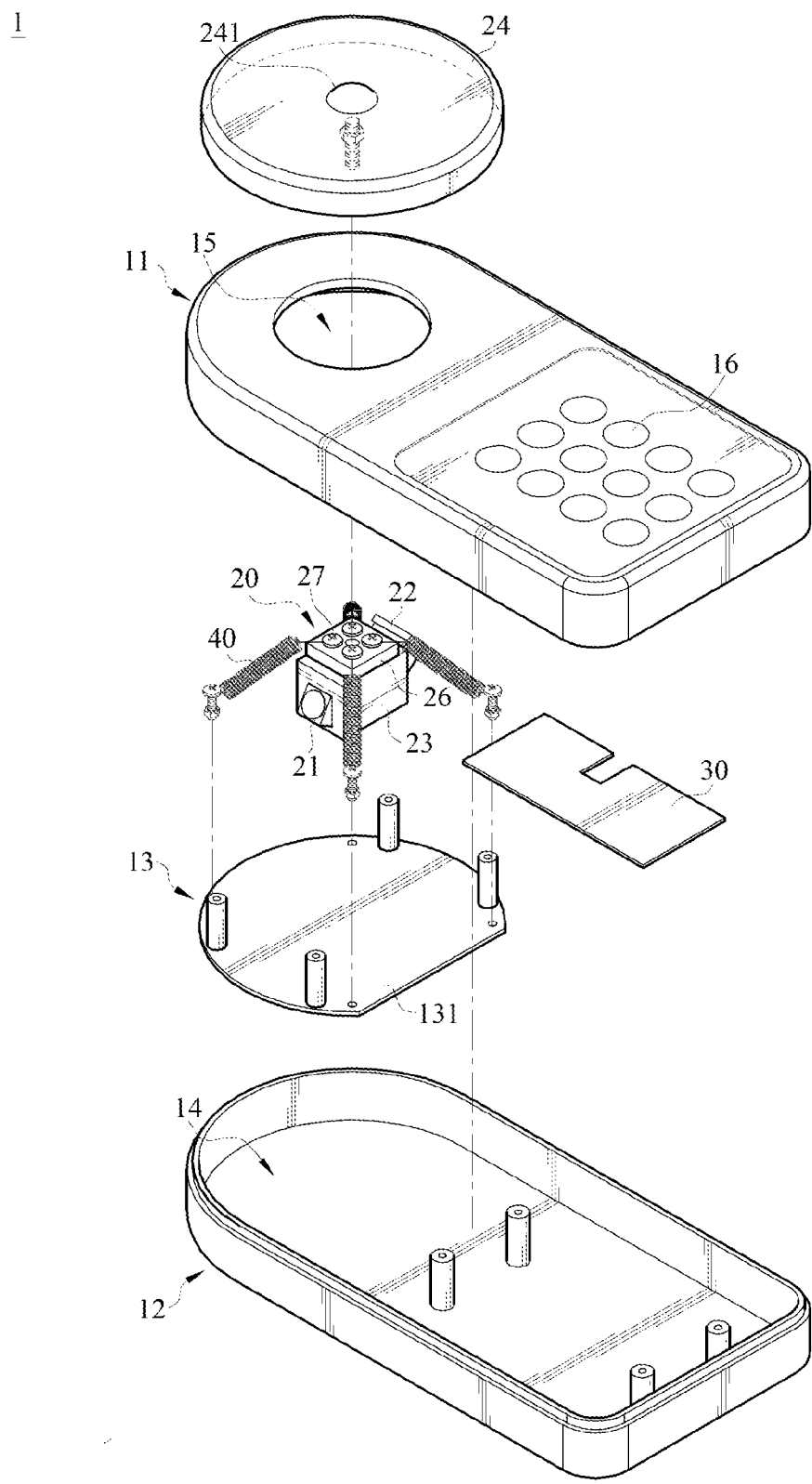
FIG. 2 is an exploded view of the portable input device according to the embodiment of the disclosure.

The following describes the portable input device according to an embodiment of the disclosure. Please refer to FIGS. 1 and 2 together, FIG. 1 is a perspective view of a portable input device according to an embodiment of the disclosure, and FIG. 2 is an exploded view of the portable input device according to the embodiment of the disclosure. This embodiment discloses a portable input device 1 comprising a casing 10, a light sensing module 20 and a printed circuit board 30. The light sensing module 20 is movably mounted inside the casing 10, but part of the light sensing module 20 is exposed outside from the casing 10. The printed circuit board 30 is mounted inside the casing 10, and the light sensing module 20 is electrically connected to the printed circuit board 30. In this embodiment, the light sensing module 20 is moved with respect to the casing 10 to generate a value of movement and transmit a sensing signal about the value to the printed circuit board 30. The printed circuit board 30 is configured for computing and processing the sensing signal before transmitting another signal about the value of movement generated by the light sensing module 20 to an electronic device. Therefore, a cursor, on a screen of the electronic device, is moved according to the value of movement generated by the light sensing module 20. However, the action of the movement of the cursor is not limited to the disclosure. In other embodiments, the portable input device 1 controls the operation of a program of the electronic device by employing the value of movement of the light sensing module 20.

The following describes the detailed structure of the casing 10. In this embodiment, the casing 10 comprises an upper shell 11, a bottom shell 12 and a reflecting member 13. The upper shell 11 and the bottom shell 12 are connected with each other to form an accommodating space 14 inside together. The printed circuit board 30 is securely mounted on the upper shell 11. Furthermore, the reflecting member 13 is securely mounted on the bottom shell 12 and inside the accommodating space 14. The reflecting member 13 includes a reflecting surface 131 facing the upper shell 11. In this embodiment, the reflecting surface 131 is a plane, but the plane is not limited to the disclosure. In other embodiments, the reflecting surface 131 is an arc surface. Moreover, the casing 10 further includes a through hole 15 and a plurality of button 16. The through hole 15 is formed at the upper shell 11, and the position of the through hole 15 corresponds to that of the reflecting surface 131 of the reflecting member 13. Furthermore, the button 16 is mounted on the upper shell 11 and electrically connected to the printed circuit board 30. The user may trigger the button 16 to make the printed circuit board 30 transmit a command to the electronic device.

Figure 3:
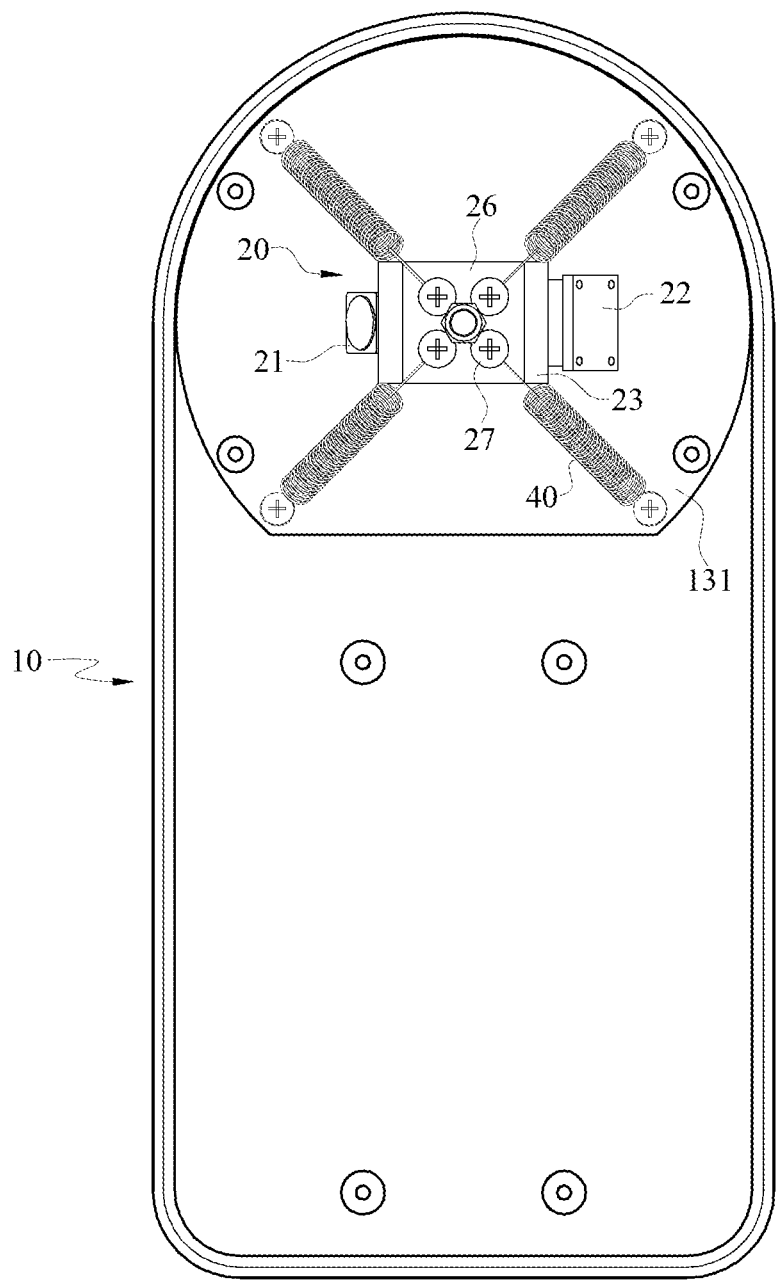
FIG. 3 is a top view of a combination of a bottom shell, a reflecting member, a light sensing module and a flexible resetting member of the portable input device according to the embodiment of the disclosure.
Figure 4:
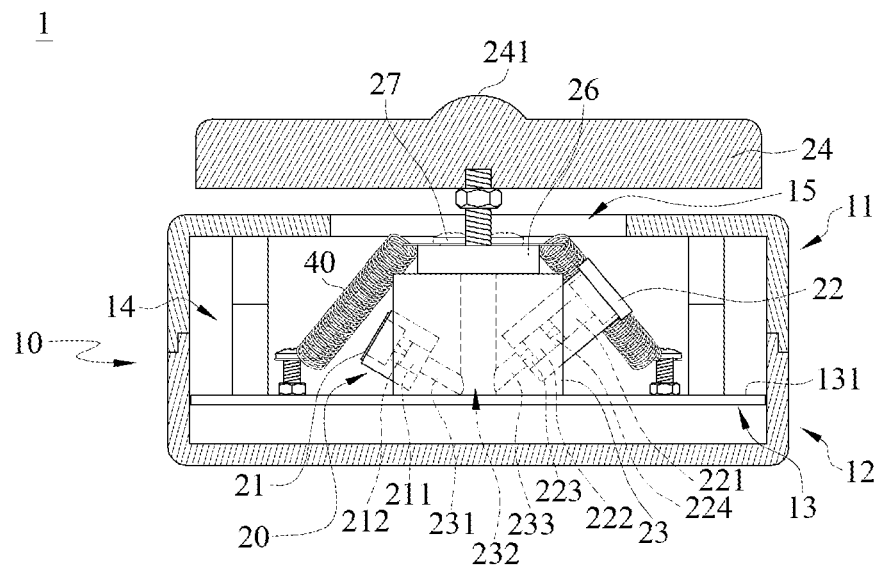
FIG. 4 is a cross-sectional view along a line 4-4 in FIG. 1.

The following describes the detailed structure of the light sensing module 20. Please refer to FIGS. 2 to 4, FIG. 3 is a top view of a combination of a bottom shell, a reflecting member, a light sensing module and a flexible resetting member of the portable input device according to the embodiment of the disclosure. FIG. 4 is a cross-sectional view along a line 4-4 in FIG. 1. In this embodiment, the light sensing module 20 is movably mounted on the reflecting member 13 on the casing 10, and part of the light sensing module 20 is exposed form the casing 10 by penetrating the through hole 15. The light sensing module 20 comprises a lighting member 21, a sensor 22 and a main body 23. The lighting member 21 and the sensor 22 are mounted on two opposite sides of the main body 23, respectively. The lighting member 21 and the sensor 22 both face the reflecting member 13. The lighting member 21 is adapted for emitting a light to the reflecting member 13 to form a light spot. The sensor 22 is adapted for receiving the light reflected by the reflecting member 13 and configured for transmitting a sensing signal based on the received light. In this embodiment, the lighting member 21 is a vertical-cavity-surface-emitting laser (VCSEL), the sensor 22 is a complementary metal-oxide semiconductor sensor (CMOS Sensor). However, the above exemplary types of the lighting member 21 and the sensor 22 are not limited to the embodiments of the disclosure.

The following describes the detailed structure of the main body 23. In this and some other embodiments, the main body 23 is in direct contact with the reflecting surface 131 of the reflecting member 13 and is freely moved on the reflecting surface 131 by receiving an external force. Specifically, the main body 23 includes an incident hole 231, an emergent hole 232 and a light penetrating hole 233. The light penetrating hole 233 directly faces the reflecting surface 131 of the reflecting member 13, and two opposite sides of the light penetrating hole 233 are connected to an end of emergent hole 232 and an end of the light penetrating hole 233. Moreover, the other end of the emergent hole 232 faces the sensor 22, and the other end of the incident hole 232 faces the lighting member 21. In this and some other embodiments, the main body 23 further comprises a fixing plate 26 and four fixing members 27. The fixing plate 26 is located between the light penetrating hole 233 and the through hole 15. The four fixing members 27 are mounted on the fixing plate 26. In the embodiment, the fixing member 27 is a screw which is affixed to the fixing plate 26.

The following describes the detailed structures of the lighting member 21 and the sensor 22. In this and some other embodiments, the lighting member 21 further comprises a light emitting channel 211 and a first lens 212 mounted inside the light emitting channel 211 for concentrating the light. The light which is emitted by the lighting member 21 illuminates to the light penetrating hole 233 through the light emitting channel 211. Then, the light passes out of the light sensing module 20 via the light penetrating hole 233 to the reflecting surface 131 of the reflecting member 13. The reflecting surface 131 reflects the light emitted by the lighting member 21 towards the main body 23 again. The sensor 22 further comprises a light receiving channel 221, a second lens 222 and two pinhole members 223 and 224. The pinhole member 223, the second lens 222 and the pinhole member 224 are mounted inside the light receiving channel 221 in series, and the second lens 222 is sandwiched between the two pinhole members 223 and 224. The pinhole members 223 and 224 are adapted for limiting or blocking how much light entering the sensor 22, which avoids scattered light. The second lens 222 is adapted for concentrating the light, making the light path shortened as well as miniaturizing the light sensing module 20. In this embodiment, the light reflected by the reflecting member 13 is emitted to the sensor 22 through the second lens 222 and the pinhole members 223 and 224. The sensor 22 receives and converts the light to a sensing signal before transmitting the sensing signal to the printed circuit board 30. Furthermore, the light emitting channel 211 forms an angle with the reflecting surface 131, and the light receiving channel 221 forms another angle with the reflecting surface 131. The above-mentioned angles may be the same of different from each other.

In this and some other embodiments, the light sensing module 20 further comprises a moving member 24 located outside the casing 10. The moving member 24 penetrates the through hole 15 for connecting the main body 23. The user may touch and move the moving member 24 to drive the light sensing module 20 to move on the reflecting member 13. Moreover, a protrusion 240 is located on the center of the moving member 24, and it is convenient for the user to apply a force on the moving member 24 by touching the protrusion 240.

In this and some other embodiments, the portable input device 1 further comprises four flexible resetting members 40. Two ends of each flexible resetting member 40 are connected to the reflecting member 13 and the light sensing module 20, respectively. In this embodiment, the flexible resetting members 40 are respectively mounted on the fixing members 27 on the light sensing module 20. Thus, the flexible resetting members 40 provide a pulling force for the light sensing module 20 towards the reflecting member 13. When the light sensing module 20 is moved on the reflecting member 13, the flexible resetting members 40 provide a flexible resetting force for the light sensing module 20, such that the light sensing module 20 is returned to the original position. Because the four flexible resetting members 40 are evenly located on four sides of the light sensing module 20, the four flexible resetting members 40 may stably provide four pulling forces in four even directions to make the light sensing module 20 return to the original positions. Furthermore, the flexible resetting member 40 is a tension spring (i.e., expansion spring), but the number and the type of the flexible resetting member 40 is not limited to the disclosure. In other embodiments, as long as the portable input device 1 comprises at least one flexible resetting member 40, the light sensing module 20 may be returned to the original position simultaneously by the at least one flexible resetting member 40.

Figure 5:
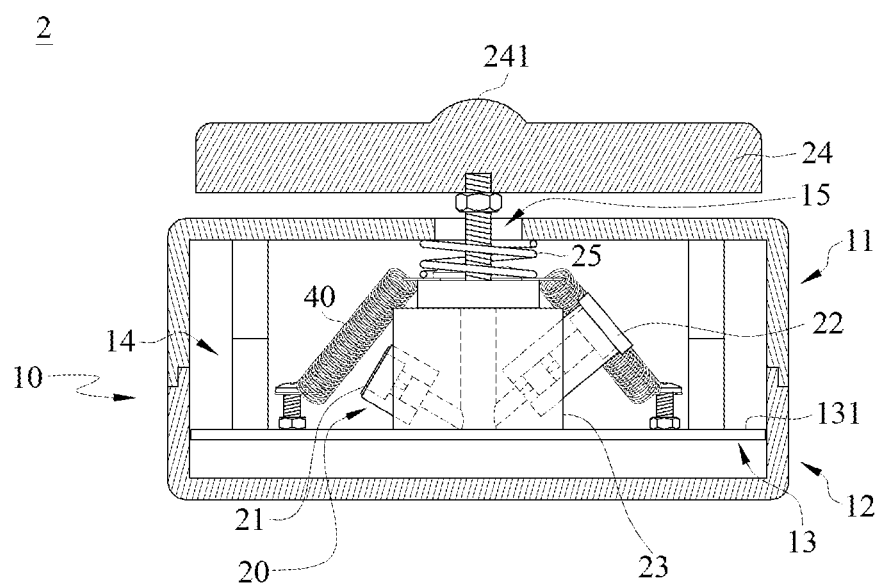
FIG. 5 is a cross-sectional view of a portable input device according to another embodiment of the disclosure.

Please refer to FIG. 5, which is a cross-sectional view of a portable input device according to another embodiment of the disclosure. The configuration of this embodiment is similar to that of the above embodiments, so the same numerals represent similar structures. The difference between this embodiment and the above embodiments is that the portable input device 2 further comprises a pressing member 25. One end of the pressing member 25 is connected to the main body 23, and the other end of the pressing member 25 is connected to the upper shell 11 of the casing 10. The pressing member 25 is adapted for providing a pushing force for the main body 23 to make the main body 23 tightly attached to the reflecting surface 131 of the reflecting member 13. Therefore, the portable input device 2 is stably moved with respect to the reflecting member 13. In this embodiment, the pressing member 25 is a compression spring, but is not limited to the embodiments of the disclosure.

Figure 6:
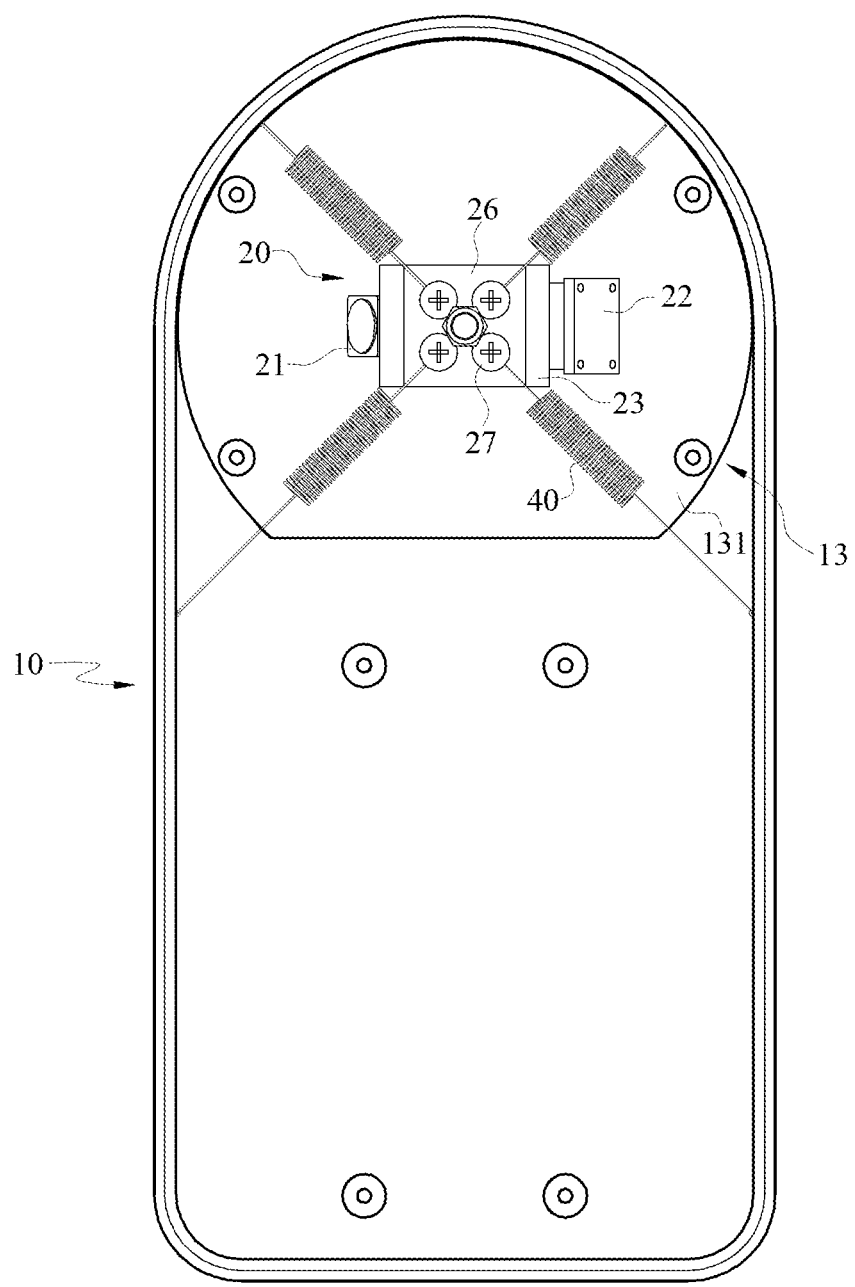
FIG. 6 is a top view of a combination of a bottom shell, a reflecting member, a light sensing module and a flexible resetting member of a portable input device according to yet another embodiment of the disclosure.

However, the configuration of the two opposite ends of the flexible resetting member 40 connecting to the reflecting member 13 and the light sensing module 20 is not limited to the disclosure. Please refer to FIG. 6, which is a top view of a combination of a bottom shell, a reflecting member, a light sensing module and a flexible resetting member of a portable input device according to yet another embodiment of the disclosure. The configuration of this embodiment is similar to that of the above embodiments, so the same numerals represent similar structures. The difference between this embodiment and the above embodiments is that the portable input device 3 further comprises four flexible resetting members 40 whose two opposite ends are connected to the casing 10 and the light sensing module 20, respectively. Thus, the flexible resetting members 40 may provide a pulling force towards the casing 10 to make the light sensing module 20 return to its original position.

To sum up, in the portable input device disclosed in this disclosure, the light sensing module is movably mounted on the reflecting member of the casing and part of the light sensing module is exposed outside from the casing, the user may control the light sensing module to move with respect to the casing, such that the sensor may precisely detect the movement of the light spot (i.e., value of movement) generated by the light emitted by the lighting member. Therefore, such a sensing manner increases the sensitivity of the portable input device.

What is claimed is:

1. A portable input device, comprising:
a casing comprising a reflecting member;
a light sensing module movably mounted on the reflecting member and exposed from the casing, the light sensing module comprising a main body, a lighting member and a sensor, the lighting member and the sensor both facing the reflecting member, the lighting member and the sensor being mounted on two opposite sides of the main body, the main body comprising a light penetrating hole, an incident hole and an emergent hole, the light penetrating hole facing the reflecting member, the two opposite ends on the incident hole facing an end of the light penetrating hole and the lighting member, and the two opposite ends of the emergent hole facing the other end of the light penetrating hole and the sensor, the lighting member adapted for emitting light to the reflecting member, and the sensor adapted for receiving the light reflected by the reflecting member and configured for transmitting a sensing signal; and
a printed circuit board mounted on the casing and electrically connected to the light sensing module, and the printed circuit board configured for processing the sensing signal to compute a value of movement of the light sensing module moving with respect to the reflecting member.

2. The portable input device according to claim 1, wherein the light sensing module further comprises a moving member, the casing includes a through hole, and the moving member is located outside the casing and penetrates through the through hole to connect with the main body.

3. The portable input device according to claim 2, wherein the light sensing module further comprises a pressing member, an end of the pressing member is connected to the main body, the other end of the pressing member is connected to an upper shell of the casing, and the pressing member is adapted for providing a pushing force for the main body.

4. The portable input device according to claim 3, further comprising a plurality of flexible resetting members, the two opposite ends of each of the plurality of flexible resetting members are connected to the reflecting member and the light sensing module, respectively.

5. The portable input device according to claim 1, further comprising a plurality of flexible resetting members, the two opposite ends of each of the plurality of flexible resetting members are connected to the casing and the light sensing module.

6. The portable input device according to claim 1, wherein the lighting member further comprises a light emitting channel and a first lens, the light emits through the light emitting channel, and the first lens is located inside the light emitting channel.

7. The portable input device according to claim 1, wherein the sensor further comprises a light receiving channel, a second lens and a pinhole member, the light reflected by reflecting member emits through the light receiving channel, and the second lens and the pinhole member are located inside the light receiving channel in series.

8. The portable input device according to claim 1, wherein the casing comprises a plurality of buttons electrically connected to the printed circuit board.

* * * * *